United States Patent [19]

Amagaya

[11] Patent Number: 4,761,094
[45] Date of Patent: Aug. 2, 1988

[54] DEVICE FOR COMBINING PAIR OF STATIONERY COMPONENTS

[75] Inventor: Hidefumi Amagaya, Yokohama, Japan

[73] Assignee: Plus Corporation, Tokyo, Japan

[21] Appl. No.: 76,834

[22] Filed: Jul. 23, 1987

[30] Foreign Application Priority Data

Nov. 6, 1986 [JP] Japan .................. 61-170703[U]

[51] Int. Cl.$^4$ ................................. F16D 1/00
[52] U.S. Cl. ........................ 403/341; 403/286; 403/339
[58] Field of Search ............ 403/339, 340, 341, 286

[56] References Cited

U.S. PATENT DOCUMENTS 709,400  9/1902  Fitzpatrick ................... 403/341
4,649,679  3/1987  Arens ....................... 403/341 X

FOREIGN PATENT DOCUMENTS 1053275  9/1953  France ......................... 403/341

Primary Examiner—Andrew V. Kundrat
Attorney, Agent, or Firm—McAulay, Fields, Fisher, Goldstein & Nissen

[57] ABSTRACT

Disclosed is a device for combining a pair of components that form part of an item of stationery. The pair of components are connected to each other at one end of the opposing surfaces of the components. The components each have a locking portion at a side edge thereof. A connecting member is fitted into these locking portions.

5 Claims, 4 Drawing Sheets

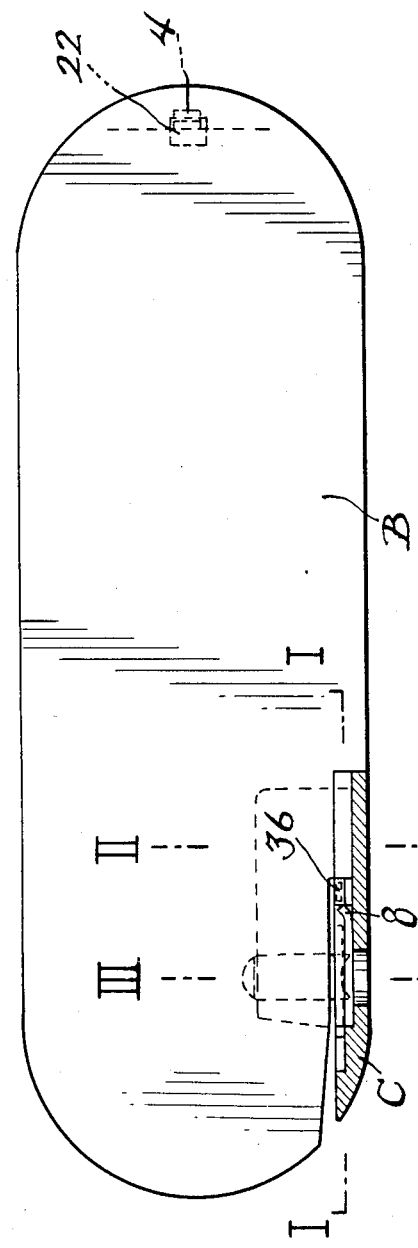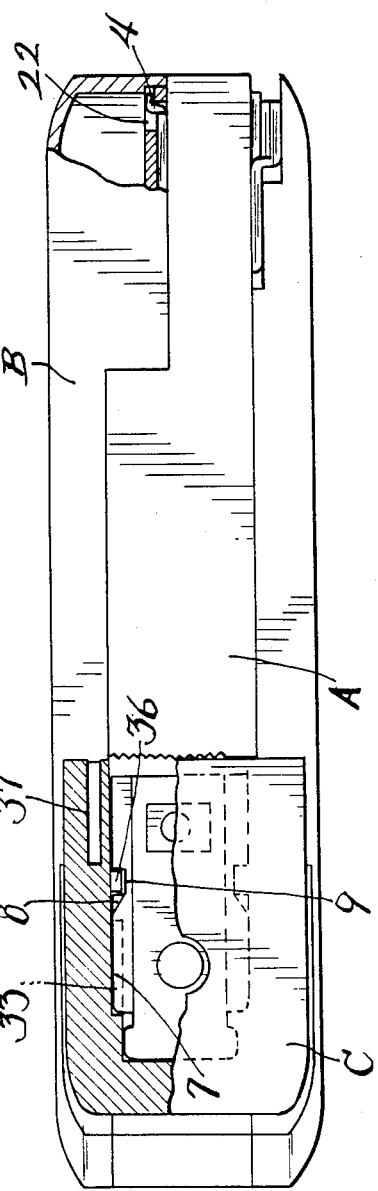

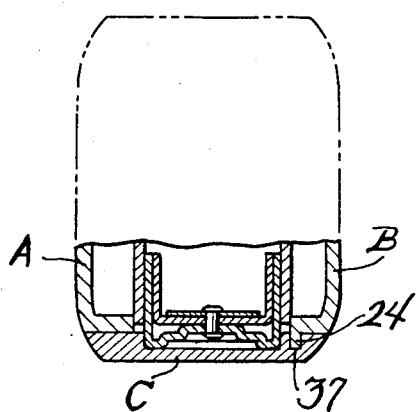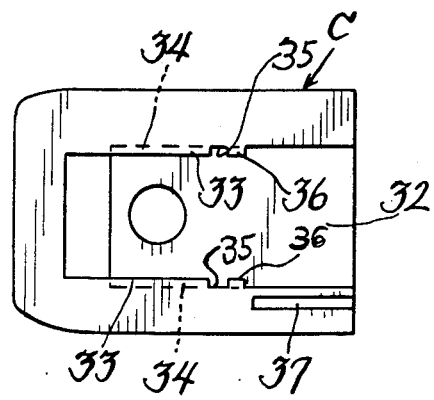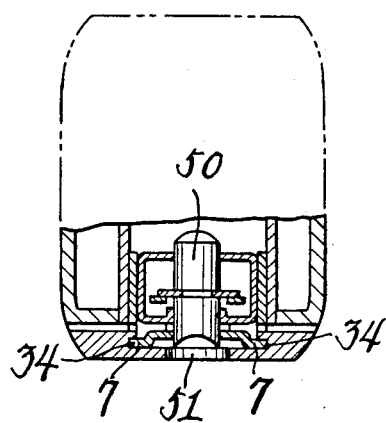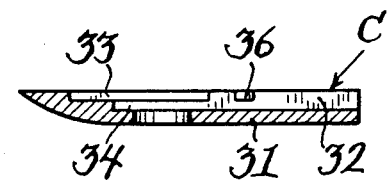

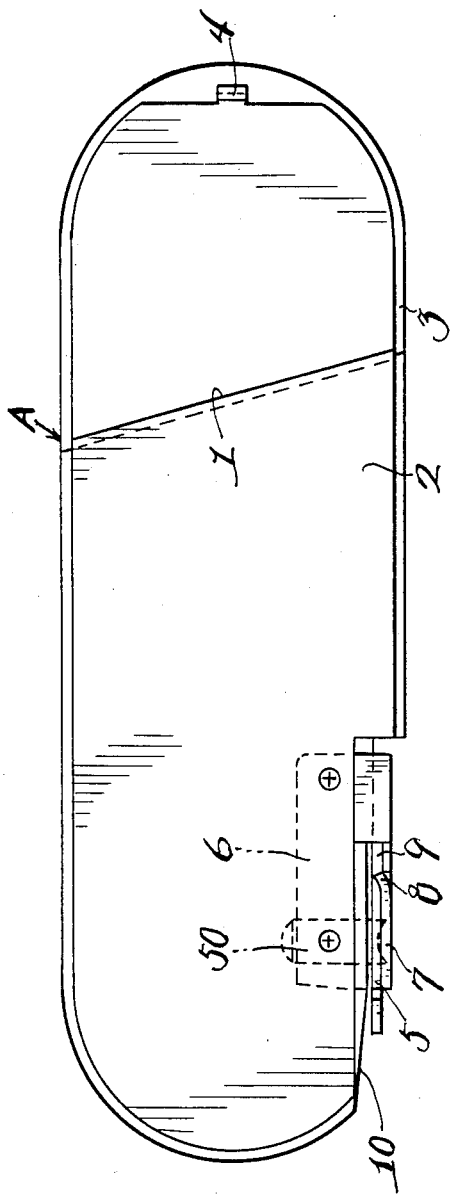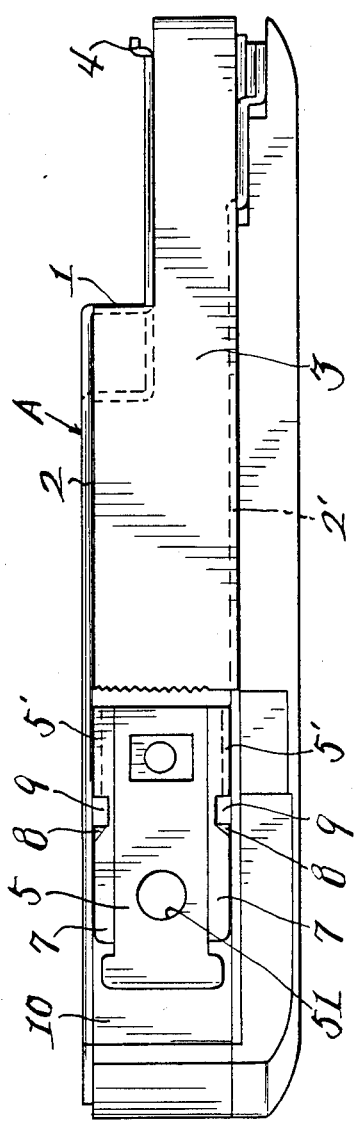

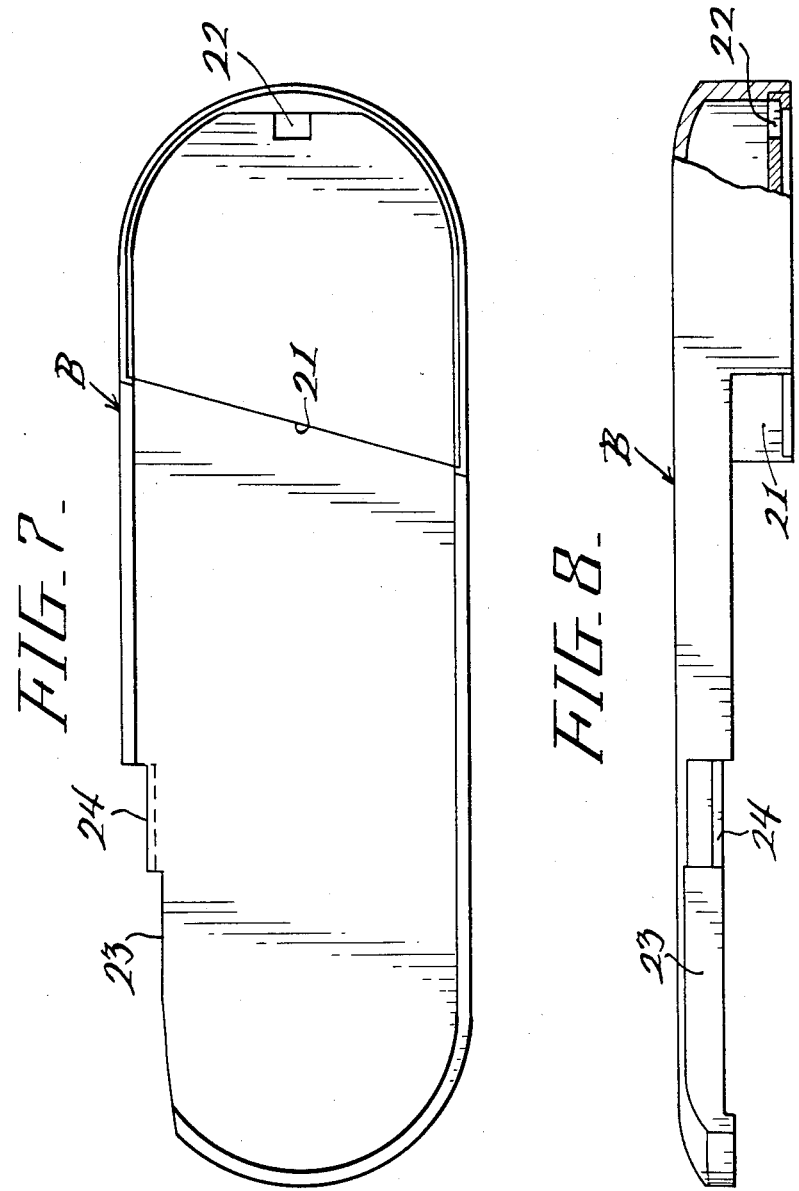

DEVICE FOR COMBINING PAIR OF STATIONERY COMPONENTS

BACKGROUND OF THE INVENTION

1. Field of the Invention

The present invention relates to a device for combining a pair of components which form part of an item of stationery which is used in mounting a cover member made of synthetic resin on the surface of an item of stationery.

2. Description of the Prior Art

It is known to ornament the design of an item of stationery by furnishing the surface thereof with a cover member made of synthetic resin.

In general, such an assembly is made by bonding together a pair of components or by fastening them together with screws.

However, when combined together with an adhesive, the components may separate easily as the adhesive used may change with time. The latter method is also disadvantageous in that the heads of the screws stick out, ruining the appearance of the stationery.

SUMMARY OF THE INVENTION

In view of the above-described problems of the prior art, an object of the present invention is to provide a device for combining a pair of components that form part of an item of stationery which assures that the pair of components may be assembled without marring the appearance of the item, and which does not allow the combined components to be parted easily, unlike the form of assembly which employs an adhesive.

The above-described object of the present invention is achieved by providing an apparatus for combining a pair of components that form part of an item of stationery which comprises: a pair of components connected to each other at one end of the opposing surfaces of the two components, the side edge of each of the components being provided with a locking portion including projections and engaging pieces, and a connecting member for engagement with the locking portions.

BRIEF DESCRIPTION OF THE DRAWINGS

FIG. 1 is a side elevational view, with certain parts broken away, of an item of stationery;

FIG. 2 is a cross-section taken along the line I - I' of FIG. 1;

FIG. 3 is a cross-section taken along the line II - II' of FIG. 1;

FIG. 4 is a cross-section taken along the line III - III' of FIG. 1; of FIG. 1;

FIG. 5 is a side elevational view of a first component;

FIG. 6 is a bottom plan view of the first component;

FIG. 7 is a side elevational view of a second component;

FIG. 8 is a bottom plan view of the second component;

FIG. 9 is a plan view of a connecting member; and

FIG. 10 is a cross-sectional view of the connecting member.

DESCRIPTION OF THE PREFERRED EMBODIMENT

An embodiment of the present invention will be described in detail with reference to the accompanying drawings which illustrate a device for combining a pair of components which form part of an item of stationery.

The apparatus in this embodiment comprises a first component A, a second component B, and a connecting member C.

The first component A comprises: an assembly consisting of a base plate 2 having a shoulder 1 at an intermediate portion thereof, and an auxiliary base plate 2' coated with a cover 3 of synthetic resin; and a punching device mounted between the two base plates 2, 2'. The center of one end of the base plate 2 is provided with a locking piece 4. The base plate 2 is provided with a connecting piece 5 which is disposed along a side edge 10 thereof. The connecting piece 5 is constituted by a bottom plate of a basic frame 6 of the punching device disposed between the two base plates 2, 2'. The two side edges of the connecting piece 5 are provided with a pair of slightly curved fitting pieces 7, 7. That is, the pieces 7, 7 are offset slightly with respect to the plane of the piece 5, as shown in FIG. 4. The innermost portions of the fitting pieces 7, 7 are bent inwardly to form a pair of locking edges 8, 8. The innermost portions of the side edges of the connecting piece 5 are provided with a pair of connecting pieces 5', 5' with notches 9, 9 separating locking edges 8, 8 and the corresponding connecting pieces 5', 5'.

The intermediate portion of the second component B is provided with a shoulder 21 which opposes the shoulder 1 provided on the first component A. One end of the second component B is provided with an engaging edge 22 which is adapted to receive the locking piece 4. The second component B has a side edge 23 with a projection 24. The projection 24 is disposed adjacent to one of the connecting pieces 5' when the components A and B are combined.

The connecting member C comprises a main body 31. The center of one surface of the main body 31 is provided with a recessed portion 32 which is open at one end thereof. The two side edges of the recessed portion 32 are provided with a pair of protrusions 33, 33 which extend between the intermediate portion of the recessed portion 32 and the innermost ends thereof in such a manner that they meet each other across the recessed portion 32. Guide grooves 34 are formed between the respective protrusions 33, 33 and the main body 31. The two side edges of recessed portion 32 which are on the forward side thereof are respectively provided with lugs 36, 36 with gaps 35, 35 formed between the lugs 36, 36 and the protrusions 33, 33. The lugs 36, 36 each have the same width as those of the notches 9, 9 provided on the first component A. The main body 31 of the connecting member C is provided with a groove 37 which is disposed adjacent to and parallel with the recessed portion 32.

The above-described constituents are assembled to form the device of this invention in the following manner.

First, the first component A and the second component B are combined by fitting the locking piece 4 on the first component A into the engaging edge 22 on the second component B. Subsequently, the connecting member C is fitted into the combination of the first and second components A and B with the side thereof on which the recessed portion 32 is provided directed toward the first and second components A and B, by moving the connecting member C along the longitudinal direction of the components A and B in such a manner that the fitting pieces 7, 7 of the connecting piece 5 engage with the recessed portion 32. As the member moves, the lugs 36, 36 pass below the fitting pieces 7, 7, and the fitting pieces 7, 7 are then received in the corresponding guide grooves 34, 34, respectively. When the connecting member C and the combination of the components A and B are pushed in this manner, the lugs 36, 36 on the connecting member C ride under the corresponding locking edges 8, 8, and snap upwardly into the notches 9, 9 formed between the locking edges 8, 8 and the connecting pieces 5', 5', thereby being locked by the locking edges 8, 8, while the projection 24 engages with the groove 37, thus completing the device of this embodiment.

The mounted punching device has a punching rod 50 which is passed through a through-hole 51.

As will be understood from the foregoing description, it is possible with the device of the present invention to firmly assemble a pair of components to form an item of stationery. The item of stationery assembled does not separate in the way that one which is assembled by bonding of its components often does. Further, its appearance is not marred by the protrusion of screw heads, as is the case when the components are fastened together with screws.

What is claimed is:

1. A device for connecting a pair of components that form part of a cover mounting apparatus, comprising a pair of components connected to each other at one end of the opposing surfaces of said components, each of said components having a side edge provided with respective locking portions, the locking portion of at least one of said components including a projection, the locking portion of the other of said components including a member having outwardly extending ears, and a connector having a plurality of grooves adapted to slidingly receive said ears and said projection to maintain said components together.

2. A device as in claim 1, in which said member extends in the same direction as said projection, and said ears comprise a pair of ears extending over a portion of the length of said member, said connector having a recess for receiving said member therein, and a plurality of opposed grooves in said recess slidingly receiving a respective one of said ears therein.

3. A device as in claim 2, in which said connector includes a slot for receiving said projection therein.

4. A device as in claim 3, in which the ends of said ears curve inwardly toward said component, and lugs on said connector positioned for locking engagement with said curved ends to maintain said connector in place.

5. A device as in claim 4, in which said lugs are spaced from said grooves.

* * * * *